(12) United States Patent
Aktas

(10) Patent No.: US 9,981,570 B2
(45) Date of Patent: *May 29, 2018

(54) BALL BEARING APPLICATION FOR SEAT RECLINER DISK MECHANISMS

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/696,682

(22) Filed: Sep. 6, 2017

(65) Prior Publication Data

US 2017/0361734 A1 Dec. 21, 2017

Related U.S. Application Data

(63) Continuation of application No. 14/861,410, filed on Sep. 22, 2015, now Pat. No. 9,796,301.

(51) Int. Cl.
*B60N 2/22* (2006.01)
*F16C 33/58* (2006.01)
*F16C 33/41* (2006.01)
*F16C 19/16* (2006.01)
*F16C 19/06* (2006.01)
*F16C 33/38* (2006.01)
*F16C 33/46* (2006.01)

(52) U.S. Cl.
CPC ............ *B60N 2/22* (2013.01); *F16C 19/06* (2013.01); *F16C 19/163* (2013.01); *F16C 33/38* (2013.01); *F16C 33/418* (2013.01); *F16C 33/581* (2013.01); *F16C 33/46* (2013.01); *F16C 2326/08* (2013.01); *Y02T 10/865* (2013.01)

(58) Field of Classification Search
CPC ....... B60N 2/2213; B60N 2/22; B60N 2/2257
See application file for complete search history.

(56) References Cited

U.S. PATENT DOCUMENTS

| 3,214,999 A | 11/1965 | Lapp |
| 4,094,210 A | 6/1978 | Wirtz et al. |
| 4,200,333 A | 4/1980 | Cremer et al. |
| 4,690,458 A | 9/1987 | Pipon et al. |
| 4,715,656 A | 12/1987 | Walk et al. |
| 4,781,416 A | 11/1988 | Johnson et al. |

(Continued)

FOREIGN PATENT DOCUMENTS

| EP | 0425237 | 10/1990 |
| EP | 0631901 | 1/1995 |

*Primary Examiner* — Timothy J Brindley
(74) *Attorney, Agent, or Firm* — Vichit Chea; Price Heneveld LLP

(57) ABSTRACT

A vehicle seat includes a seat base and a seat back rotationally connected at a pivot. The seat base is rotatable about the pivot between a plurality of rotational positions relative to the seat base. A recliner disk is positioned at the pivot. The recliner disk includes a guide plate coupled to the seat base and a tooth plate coupled to the seat back. A plurality of bearings is positioned between the guide and tooth plates. The plurality of bearings and the guide and tooth plates are free of an internal braking mechanism. The engagement of the guide and tooth plates with the bearings provide for substantially free rotational movement between the plurality of rotational positions. The bearings also fix the relative axial position of the guide plate relative to the tooth plate.

17 Claims, 7 Drawing Sheets

(56) References Cited

U.S. PATENT DOCUMENTS

| | | |
|---|---|---|
| 5,005,906 A | 4/1991 | Suzuki et al. |
| 5,209,637 A | 5/1993 | Reubeuze |
| 5,643,128 A | 7/1997 | Kennedy |
| 5,896,973 A | 4/1999 | Hochmuth et al. |
| 6,032,777 A | 3/2000 | Denis |
| 6,267,443 B1 | 7/2001 | Kurita et al. |
| 6,616,241 B1 | 9/2003 | Masuda et al. |
| 7,677,666 B2 | 3/2010 | Grable |
| 8,109,373 B2 | 2/2012 | Paing et al. |
| 9,051,978 B2 | 6/2015 | Karthaus |
| 9,327,618 B2 | 5/2016 | Villarroel et al. |
| 2011/0203893 A1 | 8/2011 | Karthaus |
| 2015/0158398 A1 | 6/2015 | Kim |

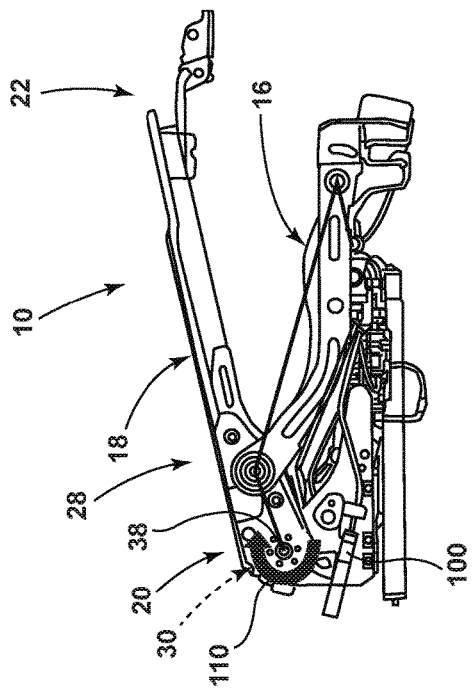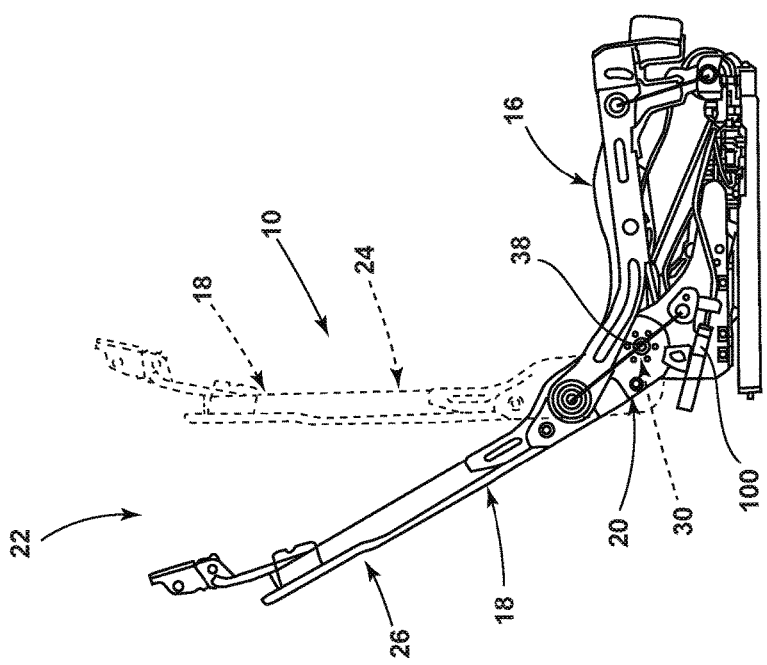

BALL BEARING APPLICATION FOR SEAT RECLINER DISK MECHANISMS

CROSS-REFERENCE TO RELATED APPLICATION

The present application is a continuation of U.S. patent application Ser. No. 14/861,410 filed Sep. 22, 2015, entitled BALL BEARING APPLICATION FOR SEAT RECLINER DISK MECHANISMS, the entire disclosure of which is hereby incorporated herein by reference.

FIELD OF THE INVENTION

The present invention generally relates to vehicle seating, and more specifically, a low friction recliner mechanism for an operable vehicle seat.

BACKGROUND OF THE INVENTION

Typically, vehicle seating includes an operable mechanism for rotating the seat back between several positions from an incline position to a recline position. Such mechanisms can typically include a release for initiating movement of the seat back and a stop or latch for securing the seat back in a particular reclined position.

SUMMARY OF THE INVENTION

According to one aspect of the present invention, a vehicle seat includes a seat base and a seat back rotationally connected at a pivot. The seat base is rotatable about the pivot between a plurality of rotational positions relative to the seat base. A recliner disk is positioned at the pivot. The recliner disk includes a guide plate coupled to the seat base and a tooth plate coupled to the seat back. A plurality of bearings is positioned between the guide and tooth plates. The plurality of bearings and the guide and tooth plates are free of an internal braking mechanism. The engagement of the guide and tooth plates with the bearings provide for substantially free rotational movement between the plurality of rotational positions. The bearings also fix the relative axial position of the guide plate relative to the tooth plate.

According to another aspect of the present invention, a vehicle seat includes a seat back rotationally operable about a rotational axis relative to a seat base, a guide plate of the seat base that rotates about the rotational axis relative to a tooth plate of the seat back and internal bearings positioned between the guide and tooth plates to secure the axial position of the tooth plate relative to the guide plate.

According to another aspect of the present invention, a vehicle seat includes a guide plate coupled to a seat base. A tooth plate is coupled to a seat back. The tooth plate and the seat back rotate about a rotational axis. Bearings are positioned between the guide and tooth plates, wherein the bearings provide for substantially unimpeded rotation of the tooth plate relative to the guide plate that is free of lateral deviation relative to the rotational axis.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a side elevational view of a seat frame incorporating an aspect of the low friction recliner disk with the seat back in an inclined position;

FIG. 3 is the seat frame of FIG. 2 with the seat back moved to a folded position;

DETAILED DESCRIPTION OF THE PREFERRED EMBODIMENTS

Figure 1:
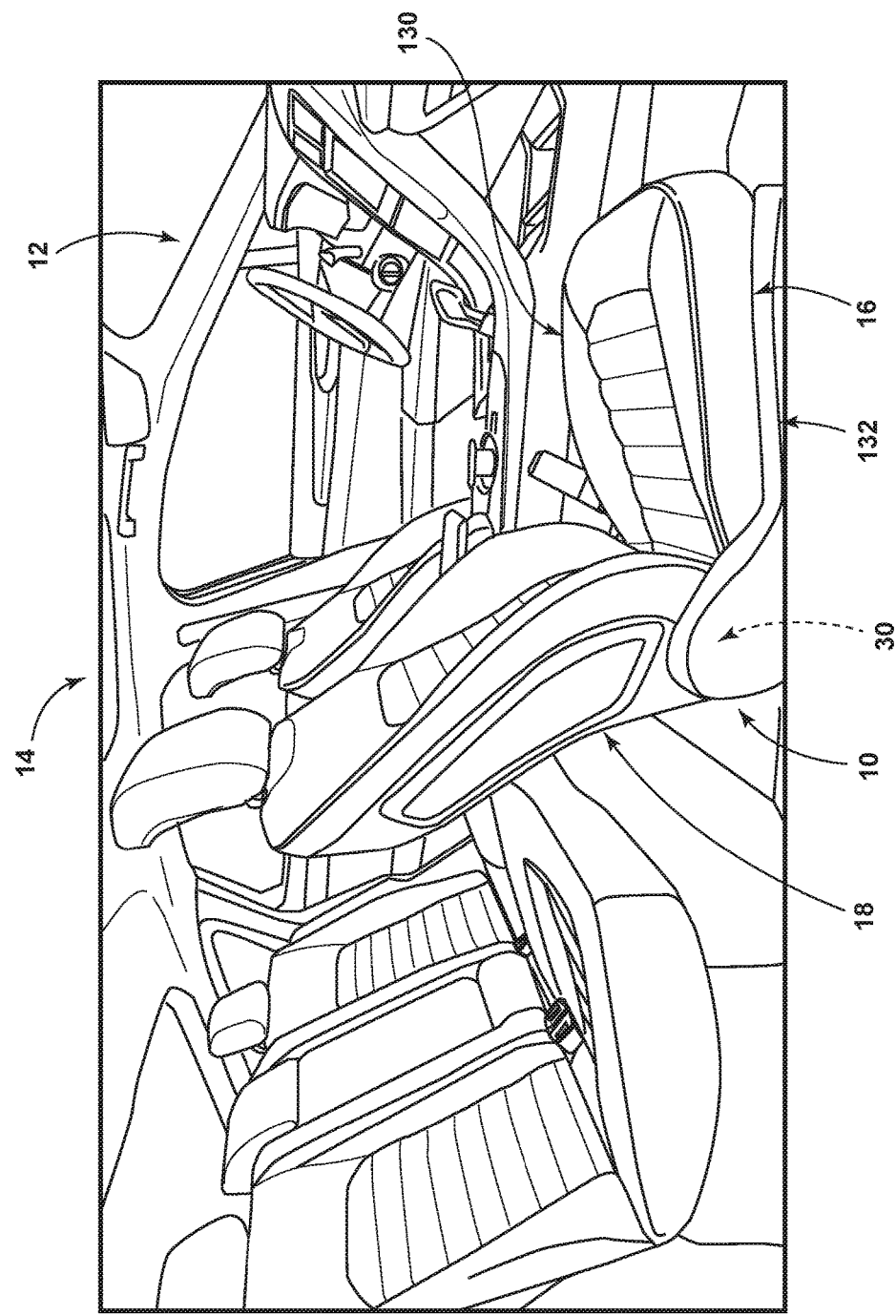
FIG. 1 is a side perspective view of a passenger cabin of a vehicle incorporating an aspect of the low friction recliner disk.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a vehicle seat installed within a passenger cabin 12 of a vehicle 14. The vehicle seat 10 can include a seat base 16 and a seat back 18 that is rotationally connected at a pivot 20. The seat base 16 is typically rotatable about the pivot 20 between a plurality of rotational positions 22 relative to the seat base 16. Such positions can include, but are not limited to, an upright position 24, a folded position 28, a reclined position 26 and various positions in between. A low friction recliner disk 30 is positioned at the pivot 20, wherein the low friction recliner disk 30 includes a guide plate 32 coupled to the seat base 16 and a tooth plate 34 coupled to the seat back 18. A plurality of bearings 36 are positioned between the guide and tooth plates 32, 34. The plurality of bearings 36 and the guide and tooth plates 32, 34 are assembled and configured to be free of an internal braking mechanism. The engagement of the guide and tooth plates 32, 34 with the bearings 36 provides a substantially free rotational movement between the plurality of rotational positions 22. It is contemplated that the bearings 36 also fix the relative axial position of the guide plate 32 relative to the tooth plate 34 to prevent the guide plate 32 and the tooth plate 34 from deflecting relative to one another. In this manner, the guide plate 32 and the tooth plate 34 are each configured to be maintained within a particular common rotational axis 38 that extends through both the guide plate 32 and the tooth plate 34. Additionally, the bearings 36 disposed between the guide plate 32 and the tooth plate 34 are positioned to operate between the guide plate 32 and the tooth plate 34 along the same rotational axis as the guide plate 32 and the tooth plate 34.

Referring again to FIGS. 4-6, it is contemplated that the guide plate 32 can include a first groove 50 within which the bearings 36 are disposed. In this manner, the first groove 50 defines a track within which the bearings 36 travel as the seat back 18 is rotated between the plurality of rotational positions 22. It is also contemplated that the tooth plate 34 can also include a second groove 52 that substantially opposes the first groove 50. The first and second grooves 50, 52 are configured to define a bearing channel 54 within which the bearings 36 are disposed to secure the guide and tooth plates 32, 34 in a fixed axial position relative to one another, to prevent deviation of either one or both of the guide and tooth plates 32, 34 away from the common rotational axis 38 of both the guide and tooth plates 32, 34.

Referring again to FIGS. 4-6, according to various embodiments, the low friction recliner disk 30 can also include a guide ring 60 that is disposed proximate the bearing channel 54. In such an embodiment, the guide ring 60 can position each of the plurality of bearings 36 in a spaced relationship within the bearing channel 54. It is contemplated that the guide ring 60 can be configured to dispose the bearings 36 at equally spaced intervals throughout the bearing channel 54. Alternatively, the bearings 36 can be spaced at various intervals throughout the bearing channel 54. Such spacing configurations can include, but are not limited to, sets of bearing pairs spaced throughout the bearing channel 54, irregular spacing, numbered sets of bearings 36, combinations thereof, and other similar spacing configurations of the bearings 36.

According to the various embodiments, the guide ring 60 can include a plurality of bearing receptacles 70. Each bearing receptacle 70 of the plurality of bearing receptacles 70 is configured to receive a corresponding bearing 36 of the plurality of bearings 36. In this manner, each bearing 36 is configured to slidably engage the respective bearing receptacle 70 to allow the bearing 36 to slidably rotate within the bearing receptacle 70. Accordingly, as the low friction recliner disk 30 is operated, and the tooth plate 34 rotates with respect to the guide plate 32, the bearings 36 roll through the bearing channel 54 and are guided by the corresponding bearing receptacles 70 in order to maintain the spacing of each of the bearings 36 as the low friction recliner disk 30 is operated to move the seat back 18 through the plurality of rotational positions 22.

Referring again to FIGS. 2-5, the guide plate 32 that is typically engaged with the seat base 16 of the vehicle seat 10 can include a plurality of outwardly extending protrusions 80 that are configured to be received by a portion of the seat base 16. In this manner, the seat base 16 is configured to receive the guide plate 32 and is substantially retained therein to secure the low friction recliner disk 30 within a particular position relative to the seat base 16. The guide plate 32 can also include a plurality of outwardly extending notches 82 that are configured to secure the guide plate 32 in a particular fixed rotational position with respect to the seat base 16. In this manner, as the seat back 18 is rotated between the plurality of rotational positions 22, the guide plate 32 maintains a substantially fixed axial position with respect to the seat base 16 along the common rotational axis 38. The guide plate 32 and the low friction recliner disk 30 in general can be further attached to the seat base 16 through various fasteners 84 that can extend through a central aperture 86 of the low friction recliner disk 30. Such fasteners 84 can include, but are not limited to, bolts, clips, screws, rivets, adhesives, welds, combinations thereof and other similar fasteners or fastening mechanisms 84. The fastener 84 used to secure the guide plate 32 to the seat base 16 is configured to secure the guide plate 32 to the seat base 16 while also allowing the tooth plate 34 to rotate relative to the guide plate 32 and also allowing the bearings 36 to rotate within the bearing channel 54. In this manner, the bearings 36 provide a substantially low friction engagement between the tooth plate 34 and the guide plate 32. This low-friction configuration substantially allows the movement of the seat back 18 between the plurality of rotational positions 22 to be smooth and substantially free of friction-based impediments.

According to the various embodiments, in order to maintain a low level of friction between the tooth plate 34 and the guide plate 32, the low friction recliner disk 30 can be made to be substantially free or completely free of an internal braking mechanism disposed proximate the bearings 36 or elsewhere in the low friction recliner disk 30. With no internal braking mechanism included within the bearings 36, or near the bearings 36, the bearings 36 are substantially free to rotate between the tooth plate 34 and the guide plate 32 to allow for the substantially friction-free movement of the seat back 18 relative to the seat base 16. When the low braking mechanism is included within the low friction recliner disk 30, various external braking mechanisms 100 and rotational securing mechanisms of the vehicle seat 10 are disposed within various alternate portions of the seat base 16 and/or the seat back 18, and away from the low friction recliner disk 30, as exemplified in FIGS. 2 and 3.

Referring again to FIGS. 4-6, it is contemplated that the guide plate 32 can also include various protrusions 80 and/or notches 82 that extend from or are recessed within the tooth plate 34 for attaching to a portion of the seat back 18 to secure the tooth plate 34 to the seat back 18. Similar to the fastening engagement between the guide plate 32 and the seat base 16, the engagement between the guide plate 32 and the seat back 18 can include various fasteners and/or fastening mechanisms 84 that can include, but are not limited to, screws, bolts, clips, rivets, or other similar fasteners 84 that are extended through the central aperture 86 of the low friction recliner disk 30, as well as adhesives, welds, and other similar features that are configured to substantially fix the position of the guide plate 32 with respect to the seat back 18 at the pivot 20 of the vehicle seat 10. Combinations of the various fasteners/fastening mechanisms 84 can also be used.

Figure 4:
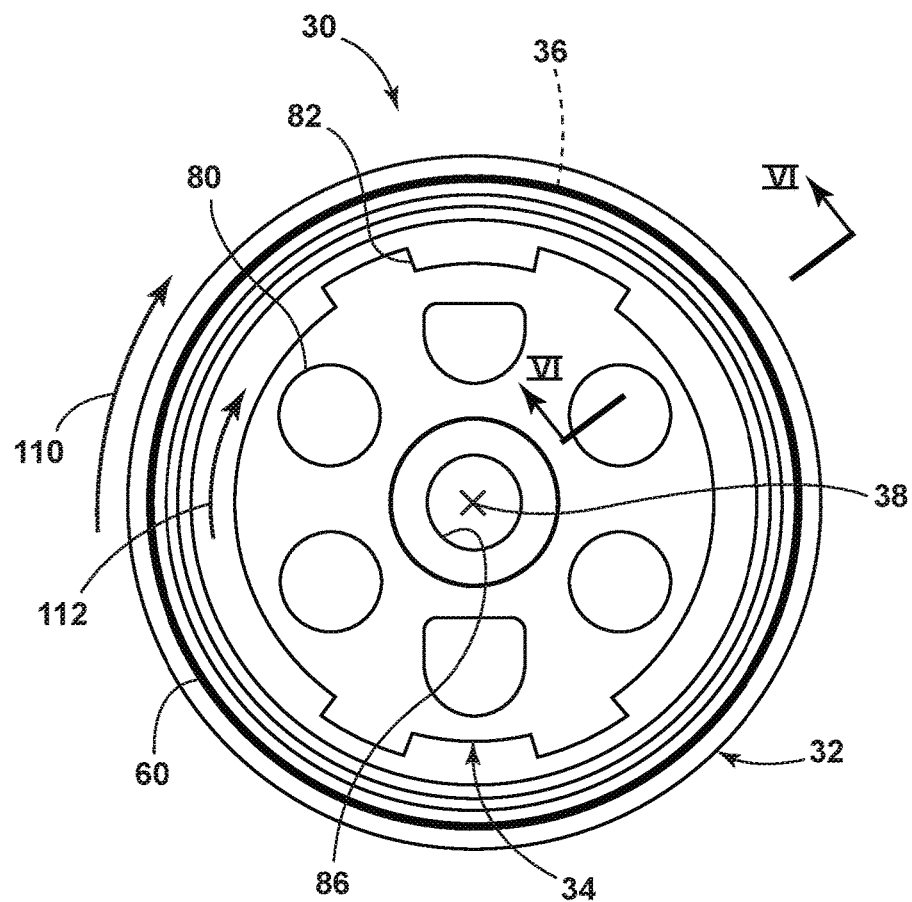
FIG. 4 is a side elevational view of an aspect of the low friction recliner disk.
Figure 5:
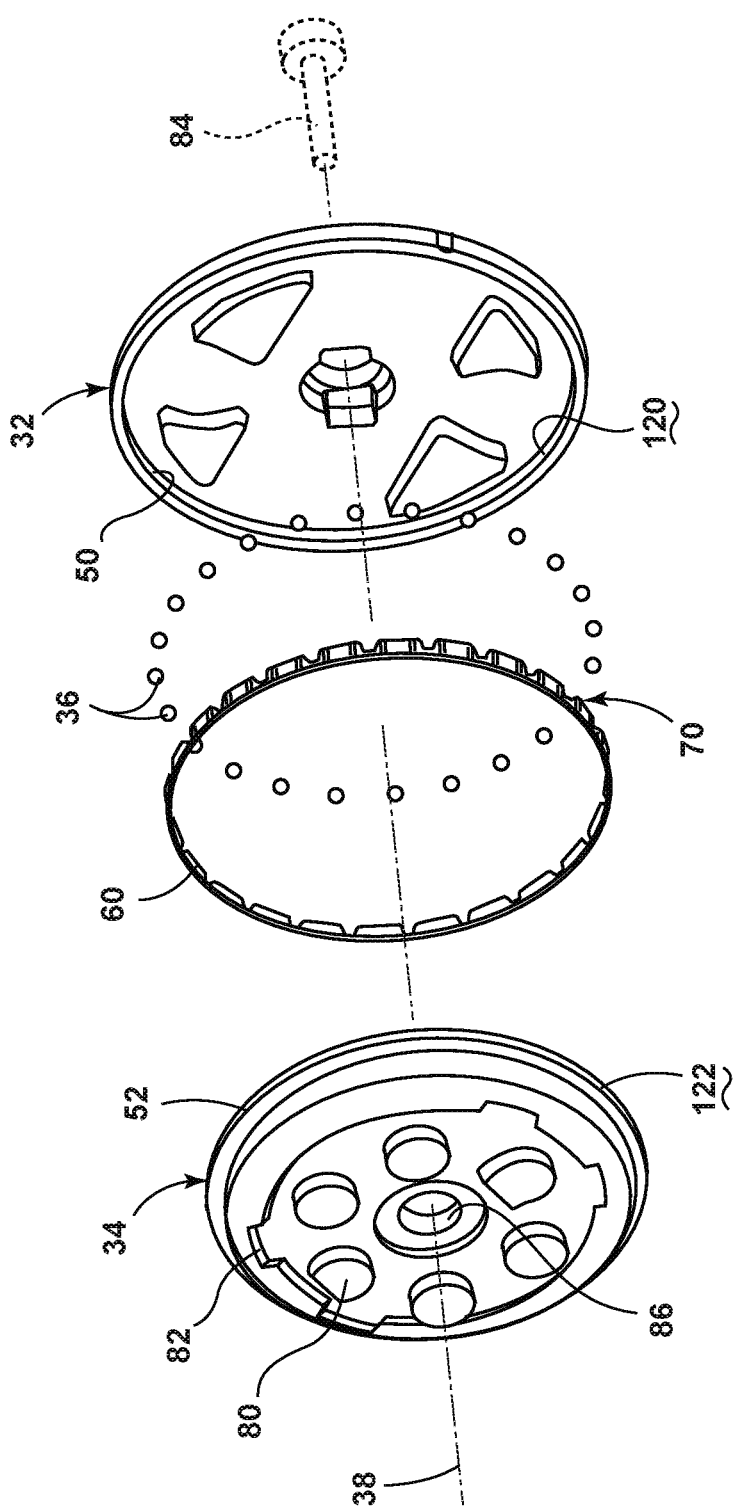
FIG. 5 is an exploded perspective view of the low friction recliner disk of FIG. 4.
Figure 6:
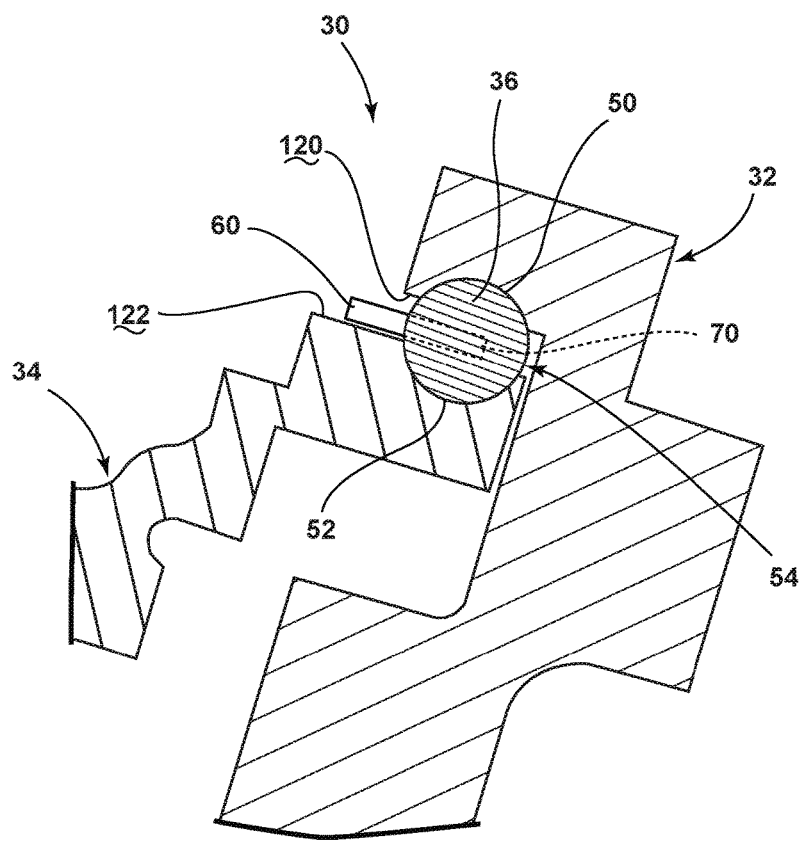
FIG. 6 is a cross-sectional view of the low friction recliner disk of FIG. 4 taken along line VI-VI.

Referring again to the various embodiments as exemplified in FIGS. 4-6, during operation of the low friction recliner disk 30, the rotation of the tooth plate 34 during movement of the seat back 18 is typically at a first rotational speed 110. The first rotational speed 110 can be the same as, or similar to, the rotational speed of the seat back 18 relative to the seat base 16. This operation of the tooth plate 34 at the first rotational speed 110 results in the plurality of bearings 36 and the guide ring 60 being rotated relative to the seat base 16 at a second rotational speed 112 that is typically less than the first rotational speed 110. The second rotational speed 112 can be determined by several factors that can include, but are not limited to, the size of the bearings 36, the depth of the bearing channel 54, the width of the bearing channel 54, the configuration of the bearings 36 (spherical, cylindrical, combinations thereof, etc.), the number of bearings 36, the depth of the guide ring 60, combinations of these factors, and other similar design considerations.

Referring again to FIGS. 4-6, it is contemplated that the engagement between the guide plate 32 and the tooth plate 34 can include the guide plate 32 extending over at least a portion of the tooth plate 34. In such an embodiment, the first groove 50 is defined within an inward-facing surface 120 of the guide plate 32 and the second groove 52 is defined within an outward-facing surface 122 of the tooth plate 34. In this configuration, the bearing 36 is disposed within the bearing channel 54 and between the inward-facing surface 120 of the guide plate 32 and the outward-facing surface 122 of the tooth plate 34. In this manner, the inclusion of the bearings 36 substantially secures the guide plate 32 and tooth plate 34 in a particular axial position such that the guide plate 32 and tooth plate 34 can rotate, relative to one another, about the common rotational axis 38 of the low friction recliner disk 30, which is typically centrally positioned. It is contemplated that the inclusion of the bearings 36 within the bearing channel 54 can provide a substantially secure fit between the guide plate 32 and tooth plate 34 such that deflection such as wobble, vibration, twisting, bending, and other similar deflections can be minimized.

It is contemplated that the bearings 36 substantially secure the guide plate 32 relative to the tooth plate 34. In order to remove the guide plate 32 and tooth plate 34 from their secure axial engagement and substantially friction free rotational engagement, one or both of the guide plate 32 and tooth plate 34 must be deflected or biased around the bearings 36. Depending on the size and number of bearings 36 and the depth of the bearing channel 54, this close-fitting engagement can be substantially secure and difficult to disengage.

Referring again to FIGS. 4-6, it is contemplated that various lubricants or other friction-limiting materials can be disposed proximate the bearings 36 to maintain a low-friction configuration between the guide plate 32 and tooth plate 34 that is provided for by the inclusion of the bearings 36 within the bearing channel 54. Such a lubricating material can include, but is not limited to, oil, grease, graphite, combinations thereof, or other similar lubricating materials.

Referring once again to FIGS. 1-6, the vehicle seat 10 can include a seat back 18 that is rotationally operable about the common rotational axis 38 relative to the seat base 16. According to the various embodiments, the common rotational axis 38 can extend through the pivot 20 of the vehicle seat 10 and extends between the left and right sides 130, 132 of the vehicle seat 10. It is also contemplated that the guide plate 32 of the seat base 16 can rotate about the common rotational axis 38 relative to the tooth plate 34 of the seat back 18. Internal bearings 36 can be positioned between the guide and tooth plates 32, 34 to secure the axial position of the guide plate 32 relative to the tooth plate 34 such that each of the guide plate 32 and tooth plate 34 can rotate relative to one another along the common rotational axis 38. While the low friction reclining disk is described herein as allowing the tooth plate 34 and guide plate 32 to rotate relative to one another, it is contemplated that the guide plate 32 coupled to the seat base 16 can be held with a substantially fixed position within the seat base 16. In this manner, the tooth plate 34, fixed to the seat back 18, rotates about the common rotational axis 38 as the seat back 18 is rotated between the plurality of rotational positions 22. It is also contemplated that the guide plate 32 and tooth plate 34 can be switched such that the guide plate 32 is attached to the seat back 18 and the tooth plate 34 is attached to the seat base 16. Additionally, while it is contemplated that typically the guide plate 32 extends over a portion of the tooth plate 34, the reverse is also possible according to various embodiments, where the tooth plate 34 extends over at least a portion of the guide plate 32 and where the first groove 50 is defined within an outward-facing surface 122 of the guide plate 32 and wherein the second groove 52 is defined within an inward-facing surface 120 of the tooth plate 34, with the bearing channel 54 defined within the first and second grooves 50, 52 and the bearings 36 disclosed within the bearing channel 54.

Referring again to FIGS. 5 and 6, it is contemplated that each of the bearing receptacles 70 defined within the guide ring 60 can be configured to extend greater than 180° about the corresponding bearing 36. In this manner, the guide ring 60 can be substantially secured to the bearings 36 as the bearings 36 move through the bearing channel 54 when the seat back 18 is moved between the plurality of rotational positions 22. It is contemplated that where the bearings 36 are spherical members, the bearing receptacle 70 can be a substantially circular member that extends more than 180° around the corresponding spherical bearing 36. Alternatively, in configurations where the various bearings 36 are substantially cylindrical, each bearing receptacle 70 of the guide ring 60 can be a substantially rectangular receptacle that extends around the cylindrical bearing 36 in a direction substantially parallel with the rotating axis of each corresponding cylindrical bearing 36. Regardless of the configuration of the bearings 36, the configuration of the guide ring 60 is configured to position each of the plurality of bearings 36 in a particular spaced position relative to each of the other bearings 36. Accordingly, as the low friction recliner disk 30 is operated, each of the bearings 36 is maintained by the guide ring 60 in the predetermined spacing positions of each of the bearings 36.

According to various embodiments of the disclosure, it is contemplated that the bearings 36 can be set in a substantially fixed position in relation to either the guide plate 32 or the tooth plate 34. In such an embodiment, the inclusion of the guide ring 60 may not be necessary as the bearings 36 can be held in their particular spacing positions by their engagement with the guide plate 32 or the tooth plate 34, depending upon the configuration of the low friction recliner disk 30. In this embodiment, where the bearings 36 are attached to the guide plate 32, the tooth plate 34 rotates about the guide plate 32 at the first rotational speed 110 and engages the bearings 36 at the bearing channel 54. The bearings 36 are maintained in engagement with the guide plate 32 or the tooth plate 34. Accordingly, the bearings 36 remain in the substantially fixed position relative to the guide plate 32 and the tooth plate 34 rotates about the guide plate 32 and the bearings 36 to define the plurality of rotational positions 22 of the seat back 18. The use of laterally fixed and rotational bearings 36 can also be implemented in the tooth plate 34, where the tooth plate 34 and the bearings 36 are configured to rotate about the guide plate 32 to define the plurality of rotational positions 22 of the seat back 18.

According to various alternate embodiments of the disclosure, it is contemplated that the guide ring 60 can include a thickened circular member with guide channels disposed on either side of the guide ring 60. In such an embodiment, it is contemplated that the guide ring 60 can define dual bearing channels 54, where one bearing channel 54 is defined between the guide ring 60 and the tooth plate 34, and a second guide channel is defined between the guide ring 60 and the guide plate 32, with two sets of bearings 36 disposed within each of the guide channels. Such a dual bearing configuration of the low friction recliner disk 30 can, in various design configurations, reduce the friction coefficient of the low friction recliner disk 30 to even more minimal levels.

Referring again to FIGS. 4-6 and 8, it is contemplated that the vehicle seat 10 can include a tooth plate 34 that is coupled to a portion of the seat back 18, and a guide plate 32 that is coupled to a portion of the seat base 16, wherein the guide plate 32 and the seat back 18 rotate about a common rotational axis 38 at a pivot 20 of the vehicle seat 10. According to the various embodiments, bearings 36 can also be positioned between the guide and tooth plates 32, 34, wherein the bearings 36 provide for substantially unimpeded rotation of the tooth plate 34 relative to the guide plate 32, such that the operation of the tooth plate 34 is substantially free of lateral deviation relative to the common rotational axis 38 of the guide plate 32 and tooth plate 34.

Figure 7:
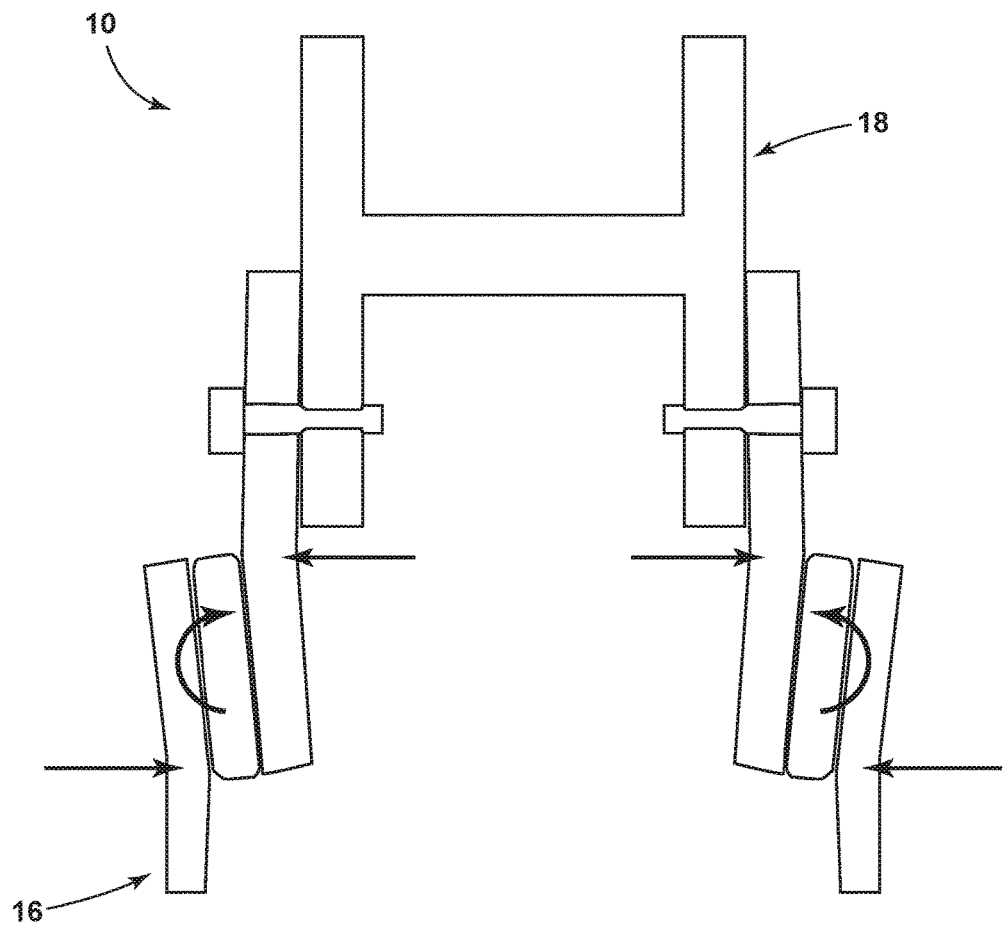
FIG. 7 is a schematic cross-sectional view of a prior-art seat frame illustrating various internal forces that affect the operability of the prior-art seat frame.
Figure 8:
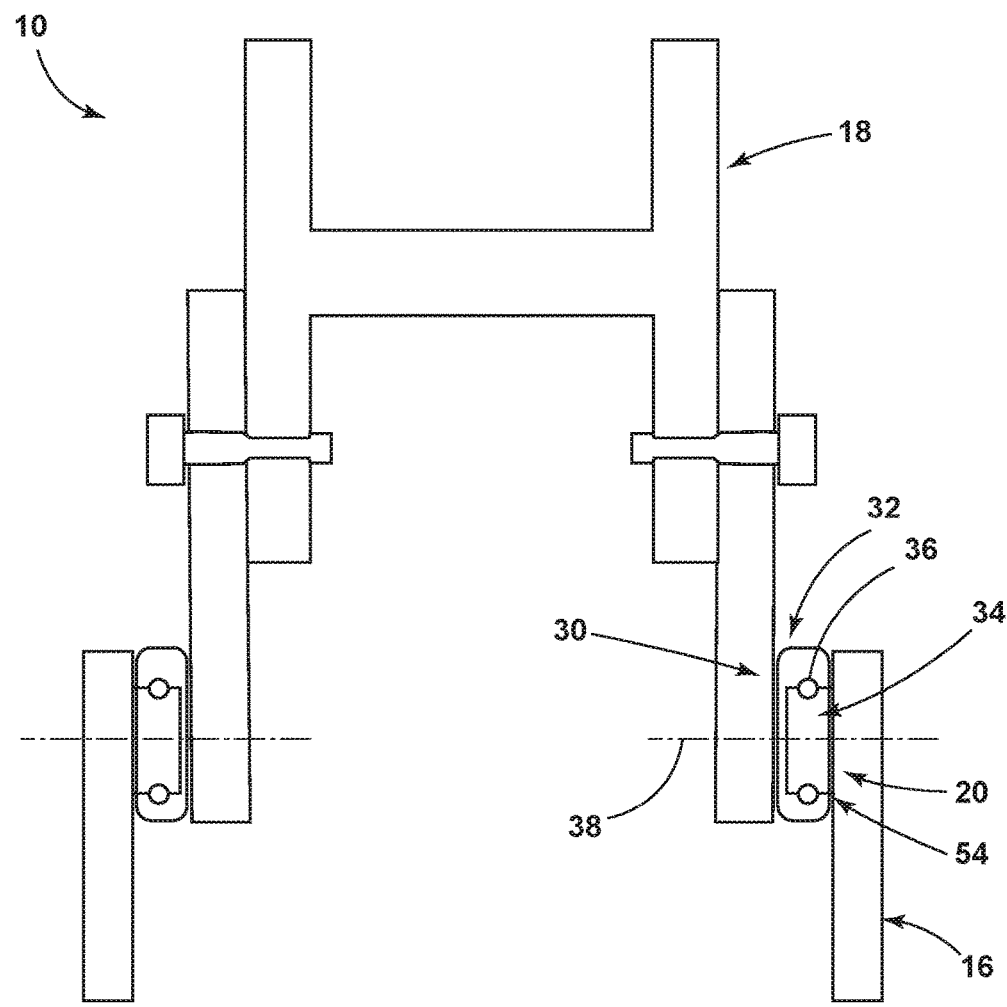
FIG. 8 is a schematic cross-sectional view of an aspect of a seat frame incorporating an aspect of the low friction recliner disk.

Referring now to the prior-art seat of FIG. 7, in various vehicle seats, a certain amount of flexion can occur as the seat back 18 is placed in the various rotational positions 22. This flexion results in conventional recliner disks experiencing a greater amount of friction and catching as the components of the conventional recliner disk rotate. This additional friction is due in part to the configuration of conventional recliner disks. The portion of a conventional recliner disk that engages a seat back 18 is afforded a certain amount of play or wobble during operation of the portion of a conventional seat. Such wobble or deflection can result in increased friction in the operation of the seat back 18 as the seat back 18 undergoes increased flexion and moment forces. Sticking and/or other impediments to smooth operation of the seat back 18 relative to the seat base 16 can also occur during use of the conventional recliner disk.

Referring again to the prior art seat of FIG. 7, the conventional recliner disk is typically configured such that the plate proximate the seat back 18 slides relative to the plate proximate the seat base 16 and the engagement between the two plates is simply a sliding engagement. In order to provide for such sliding engagement, at least a minimal gap must be present between the two plates to allow for the sliding engagement. This minimal gap also provides for the adverse deflection of wobble or vibration during operation of the conventional recliner disk. This wobble is accentuated as the seat back 18 experiences the flexion and moment forces during operation of the seat back 18 between the plurality of rotational positions 22. The wobble of the conventional recliner disk allows for components of the conventional recliner disk to engage, grind, stick, or otherwise experience a friction engagement. As such, the rotational operation of the conventional recliner disks is less smooth and less efficient.

Referring now to FIGS. 1-6 and 8, the wobble described above as to the conventional recliner disks is a condition of the frame of the vehicle seat 10. Accordingly, when the low friction recliner disk 30 is implemented, the wobble described above will still be apparent. However, the inclusion of the plurality of bearings 36 in the bearing channel 54 between the tooth plate 34 and the guide plate 32, provides a substantially secure fit between the tooth plate 34 and the guide plate 32 to prevent such axial deviation away from the common rotational axis 38 of the guide plate 32 and the tooth plate 34. In this manner, the configuration of the low friction recliner disk 30 counteracts the flexion and moment forces of the seat back 18 to provide a substantially smooth operation of the seat back 18 between the plurality of rotational positions 22. In this manner, the engagement between the guide plate 32 and the tooth plate 34 with the bearings 36 disposed therebetween substantially secures the tooth plate 34 relative to the guide plate 32 and provides a substantially friction-free rotational operation of the tooth plate 34 and the plurality of bearings 36 about the common rotational axis 38 relative to the guide plate 32. This configuration substantially limits the amount of friction experienced by the low friction recliner disk 30 during a period of seat back 18 wobble and provides for substantially smooth and convenient operation of the seat back 18 between the plurality of rotational positions 22. Additionally, because the low friction recliner disk 30 does not include a braking mechanism, according to the various embodiments, the configuration of the tooth plate 34, guide plate 32 and bearings 36 receives minimal interference from additional mechanisms that may impede the operation of the bearings 36 between the tooth plate 34 and guide plate 32. As such, increases in the friction coefficient of the system as a result of such mechanisms can be minimized.

Referring again to FIGS. 1-6 and 8, the inclusion of the bearings 36 that roll within the bearing channel 54 between the guide plate 32 and tooth plate 34 eliminates the need for a gap in the system such that the tooth plate 34 and guide plate 32 can be tightly engaged through the intermediary engagement of the plurality of bearings 36 in the bearing channel 54 defined between the guide plate 32 and tooth plate 34. Accordingly, the substantial elimination of any appreciable gaps between the engagement of the tooth plate 34 and the bearings 36 and the guide plate 32 and the bearings 36 provides for the substantially secure fit between the tooth plate 34 and guide plate 32 that minimizes the amount of deviation away from the common rotational axis 38.

According to the various embodiments, the various components of the low friction recliner disk 30 can be made of any one of various materials that can include, but are not limited to, metal, metal alloys, plastic, composite, polymers, ceramics, wood, combinations thereof, and other similar materials. It is also contemplated that the vehicle seat 10 implementing the low friction recliner disk 30 can include two low friction recliner disks 30 on either side of the vehicle seat 10. Additionally, it is contemplated that the low friction recliner disk 30 can be used in various seating configurations. Such seating configurations can include, but are not limited to, Captain's chairs, single person vehicle seats, bench seats, 50/50 split seats, 60/40 split seats, 40/20/40 split seats, and other similar seating configurations. It is also contemplated that the low friction recliner disk 30 can also be used in seat bases 16 that rotate upwards, such as configurations where the seat base 16 moves upwards to allow for access to certain portions of the passenger cabin 12 or storage areas proximate the passenger cabin 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
    a seat base and a seat back rotationally connected at a pivot, the seat back rotatable about the pivot between a plurality of rotational positions relative to the seat base;
    a recliner disk positioned at the pivot, wherein the recliner disk includes a first plate coupled to the seat base and a second plate coupled to the seat back; and
    a bearing positioned between the first and second plates, the bearing and the first and second plates being free of an internal braking mechanism, wherein engagement of the first and second plates with the bearing provides for substantially free rotational movement between the plurality of rotational positions, the bearing fixing a relative axial position of the first plate relative to the second plate; wherein
the first plate includes a first groove within which the bearing is disposed, wherein the first groove defines a track within which the bearing travels as the seat back is rotated between the plurality of rotational positions; and
the second plate includes a second groove that opposes the first groove, wherein the first and second grooves define a bearing channel within which the bearing is disposed to secure the first and second plates in a fixed axial position relative to one another, wherein the second plate is a tooth plate that is coupled to the seat back.

2. The vehicle seat of claim 1, wherein the first plate is a guide plate that is coupled to the seat base.

3. The vehicle seat of claim 1, further comprising:
a guide ring disposed proximate the bearing channel, wherein the guide ring positions the bearing within the bearing channel.

4. The vehicle seat of claim 3, wherein the guide ring includes a bearing receptacle, wherein the bearing receptacle receives the bearing, wherein the bearing is configured to slidably engage the bearing receptacle to allow the bearing to rotate within the bearing receptacle.

5. The vehicle seat of claim 3, wherein rotation of the second plate at a first rotational speed causes the bearing and the guide ring to rotate relative to the bearing channel at a second rotational speed that is less than the first rotational speed.

6. The vehicle seat of claim 1, wherein the first plate extends over at least a portion of the second plate, wherein the first groove is defined within an inward-facing surface of the first plate and wherein the second groove is defined within an outward-facing surface of the second plate.

7. The vehicle seat of claim 3, wherein the bearing is one of a plurality of bearings that are equally spaced within the bearing channel.

8. A vehicle seat comprising:
a seat back rotationally operable about a rotational axis relative to a seat base;
a first plate of the seat base that rotates about the rotational axis relative to a second plate of the seat back;
internal bearings positioned within a bearing channel defined between first and second grooves of the first and second plates, respectively, to secure an axial position of the first plate relative to the second plate, and
a guide ring disposed between the first and second plates, wherein the guide ring positions each of the internal bearings within the bearing channel.

9. The vehicle seat of claim 8, wherein the second groove opposes the first groove to define the bearing channel within which the internal bearings are disposed to secure the first and second plates in a fixed axial position relative to one another.

10. The vehicle seat of claim 8, wherein the guide ring includes a plurality of bearing receptacles, wherein each bearing receptacle of the plurality of bearing receptacles receives a corresponding bearing of the internal bearings, wherein the corresponding bearing is configured to slidably engage the bearing receptacle to allow the corresponding bearing to rotate within the bearing receptacle.

11. The vehicle seat of claim 8, wherein rotation of the second plate at a first rotational speed defines rotation of the internal bearings and the guide ring relative to the bearing channel at a second rotational speed that is less than the first rotational speed.

12. The vehicle seat of claim 9, wherein the first plate extends over at least a portion of the second plate, wherein the first groove is defined within an inward-facing surface of the first plate and wherein the second groove is defined within an outward-facing surface of the second plate.

13. The vehicle seat of claim 8, wherein the first plate is a guide plate and the second plate is a tooth plate.

14. A vehicle seat comprising:
first and second plates coupled to a seat base and a seat back, respectively, wherein the second plate and the seat back rotate about an axis; and
bearings disposed in a bearing channel defined between the first and second plates, wherein the bearings provide for substantially unimpeded rotation of the second plate relative to the first plate that is free of lateral deviation relative to the axis, and
a guide ring disposed between the first and second plates, wherein the guide ring positions each of the bearings within the bearing channel.

15. The vehicle seat of claim 14, wherein the first plate, seat back and bearings rotationally operate about a rotational axis of the second plate.

16. The vehicle seat of claim 14, wherein the bearing channel is defined by first and second grooves of the first and second plates, respectively, and wherein the bearings are disposed within the first and second grooves to secure the first and second plates in a fixed axial position relative to one another and relative to the axis.

17. The vehicle seat of claim 14, wherein the guide ring includes a plurality of bearing receptacles, wherein each bearing receptacle of the plurality of bearing receptacles receives a corresponding bearing, wherein the corresponding bearing is configured to slidably engage the bearing receptacle to allow the corresponding bearing to rotate within the bearing receptacle.

* * * * *